(12) United States Patent
Yoshida et al.

(10) Patent No.: US 6,421,181 B1
(45) Date of Patent: Jul. 16, 2002

(54) LENTICULAR LENS SHEET AND REAR PROJECTION SCREEN

(75) Inventors: Yoshiki Yoshida; Kumpei Oda; Hitomu Watanabe, all of Tokyo (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/363,687

(22) Filed: Jul. 30, 1999

(30) Foreign Application Priority Data

Aug. 3, 1998 (JP) .......................................... 10-219099

(51) Int. Cl.⁷ .............................................. G02B 27/10
(52) U.S. Cl. ........................ 359/619; 359/621; 359/623; 359/456
(58) Field of Search ................................ 359/619, 620, 359/621, 622, 623, 456, 626

(56) References Cited

U.S. PATENT DOCUMENTS

| | | | |
|---|---|---|---|
| 4,907,090 A | * 3/1990 | Ananian | 358/247 |
| 5,066,099 A | 11/1991 | Yoshida et al. | 359/457 |
| 5,307,205 A | * 4/1994 | Ludwig, Jr. et al. | 359/453 |
| 6,101,031 A | * 8/2000 | Yoshimura et al. | 359/456 |

FOREIGN PATENT DOCUMENTS

| | | |
|---|---|---|
| EP | 0542548 | 5/1993 |
| EP | 0825460 | 2/1998 |

* cited by examiner

Primary Examiner—Georgia Epps
Assistant Examiner—Timothy Thompson
(74) Attorney, Agent, or Firm—Parkhurst & Wendel, LLP

(57) ABSTRACT

A lenticular lens sheet having an entrance surface and an exit surface comprises a base part, an entrance lens part forming the entrance surface and having an array of a plurality of convex lens elements capable of gathering light rays. A tinted layer is formed at least in a portion of the entrance lens part near the entrance surface. A light absorbing layer is formed in light-nongathering regions in the exit surface in which light rays refracted by the convex lens elements do not gather.

8 Claims, 14 Drawing Sheets

LENTICULAR LENS SHEET AND REAR PROJECTION SCREEN

BACKGROUND OF THE INVENTION

1. Field of the Invention

The present invention relates to a lenticular lens sheet and a rear projection screen suitable for displaying images projected thereon by an optical image source.

2. Description of the Related Art

A known rear projection television system uses an image source including three cathode-ray tubes (CRTs), i.e., a red-image CRT, a green-image CRT and a blue-image CRT, and a rear projection screen. A rear projection screen employed in such a rear projection television system is formed by combining, for example, a Fresnel lens sheet capable of collimating light rays projected thereon in substantially parallel light rays, and a lenticular lens sheet capable of diffusing light rays to form an optical image. The rear projection screen is required to diffuse light rays in a wide range and to reduce the effect of external light on an image displayed thereon.

Referring to FIG. 6 showing a lenticular lens sheet employed in a conventional rear projection screen by way of example, the lenticular lens sheet 40 has entrance lenses 42, such as lenticular lenses, capable of gathering light rays and forming an entrance surface 41, exit lenses 47 formed near the focal points of the lenticular lenses 42, respectively, and forming an exit surface 44, ridges 48 formed between the exit lenses 47, respectively, and light-absorbing films (hereinafter referred to also as "black stripes") 49 formed on the surfaces of the ridges 48, respectively. This lenticular lens sheet is capable of diffusing light and of reducing the effect of external light.

A television projector employing an image source of cell structure, such as a liquid crystal display (LCD) or a digital micromirror device (DMD), has been developed. Such a television projector also uses the foregoing lenticular lens sheet provided with the black stripes in view of enhancing its diffusing characteristic and preventing external-light reflection. It is effective in improving contrast in images displayed on the lenticular lens sheet to increase the black stripe ratio, i.e., the ratio of the area of the black stripes to the area of the entire exit surface of the lenticular lens sheet.

However, further increase in the black stripe ratio of the foregoing conventional rear projection screen is difficult, because three color images are projected by separate projectors, such as CRTs, and the angles between the respective optical axes of the projectors are increased progressively for the reduction of the overall thickness of the rear projection television system.

The foregoing lenticular lens sheet is capable of diffusing light only in horizontal directions owing to the shape of its lenses. Therefore, the lenticular lens sheet contains optical diffusing particles (diffusing material) to diffuse light in vertical planes. The optical diffusing particles diffuse image light rays projected on the lenticular lens sheet and external light fallen on the exit surface to generate stray light rays in the lenticular lens sheet. The stray light rays thus generated deteriorates contrast in images. A means for suppressing the deterioration of contrast in images tints the entire lenticular lens sheet (body tinting), the contrast improving effect of which, however, is not necessarily satisfactory, considering reduction in transmittance attributable to tinting.

SUMMARY OF THE INVENTION

Accordingly, it is an object of the present invention to provide a lenticular lens sheet capable of enhancing contrast in images without reducing the intensity of projected optical images by suppressing the reflection of external light and of reducing the overall thickness of a rear projection television system employing the lenticular lens sheet, and to provide a rear projection screen employing such a lenticular lens sheet.

According to one aspect of the present invention, a lenticular lens sheet having an entrance surface and an exit surface comprises: a base part; an entrance lens part forming the entrance surface and having an array of a plurality of convex lens elements capable of gathering light rays; and a light absorbing layer formed in light-nongathering regions in the exit surface in which light rays refracted by the convex lens elements do not gather; in which a tinted layer is formed at least in a portion of the entrance lens part near the entrance surface.

Preferably, the lenticular lens sheet further comprises an exit lens part formed on the exit surface and having an array of a plurality of lens elements formed respectively in light-gathering regions in which light rays refracted by the convex lens elements of the entrance lens part gather.

In the lenticular lens sheet, it is preferable that the lens elements of the exit lens part are either convex or concave toward the exit surface.

In the lenticular lens sheet, it is preferable that the tinted layer contains a light diffusing material.

In the lenticular lens sheet, it is preferable that the tinted layer extends along the light receiving surface of the entrance lens part.

In the lenticular lens sheet, it is preferable that the tinted layer has portions having the shape of a wedge or a flat plane, and extending from the vertices of the convex lens elements into the entrance lens part.

According to another aspect of the present invention, a rear projection screen comprises: a lenticular lens sheet having an entrance surface and an exit surface; and a Fresnel lens sheet disposed opposite to the entrance surface of the lenticular lens sheet facing an optical image source; in which the lenticular lens sheet has: a base part; an entrance lens part formed on the entrance surface and having an array of a plurality of convex lens elements capable of gathering light rays; and a light absorbing layer formed in light-nongathering regions in the exit surface in which light rays refracted by the convex lens elements do not gather; the entrance lens part being provided with a tinted layer at least in a portion thereof near the entrance surface.

In the rear projection screen, it is preferable that the lenticular lens sheet further comprises an exit lens part formed on the exit surface and having an array of a plurality of lens elements formed respectively in light-gathering regions in which light rays refracted by the convex lens elements of the entrance lens part gather.

Preferably, the rear projection screen further comprises a front plate disposed opposite to the exit surface of the lenticular lens sheet; in which the front plate has a tinted layer formed near an entrance surface thereof or an exit surface thereof, or the front plate is entirely tinted.

In the rear projection screen, it is preferable that the lenticular lens sheet has a tinted layer formed in a portion thereof near the exit surface.

Preferably, the tinted layer has a thickness not smaller than 0.05 times the pitch of the convex lens element of the entrance lens part.

Preferably, the tinted layer has a thickness not greater than half the thickness of the lenticular lens sheet.

Preferably, the tinted layer meets an inequality: $t_1 > t_2$, where $t_1$ is the thickness of a portion of the tinted layer corresponding to a central portion of each convex lens element and $t_2$ is the thickness of a portion of the same corresponding to a peripheral portion of the convex lens element as measured along a direction perpendicular to the surface of the convex lens element.

Preferably, the light diffusing material concentration $C_1$ of the tinted layer and the light diffusing material concentration $C_0$ of the base part meet an inequality: $0 \leq C_0 < C_1$.

Preferably, the tinted layer does not contain any light diffusing material, the base part is not tinted or tinted in a color density lighter than that of the tinted layer, and a light diffusing layer containing a light diffusing material is formed between the tinted layer and the base part.

The convex lens elements of the entrance lens part may be lenticular lenses of a shape having a part which makes a tangent thereto incline to the surface of the lenticular lens sheet at an angle not smaller than the critical angle.

Preferably, the exit lens part and the front plate are provided on its exit surface with at least one of an antireflection layer, a low-reflection layer, a polarizing filter layer, an antistatic layer, a glareproof layer and a hard coating layer.

Preferably, the rear projection screen has a total light transmittance in the range of 40% to 70%.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
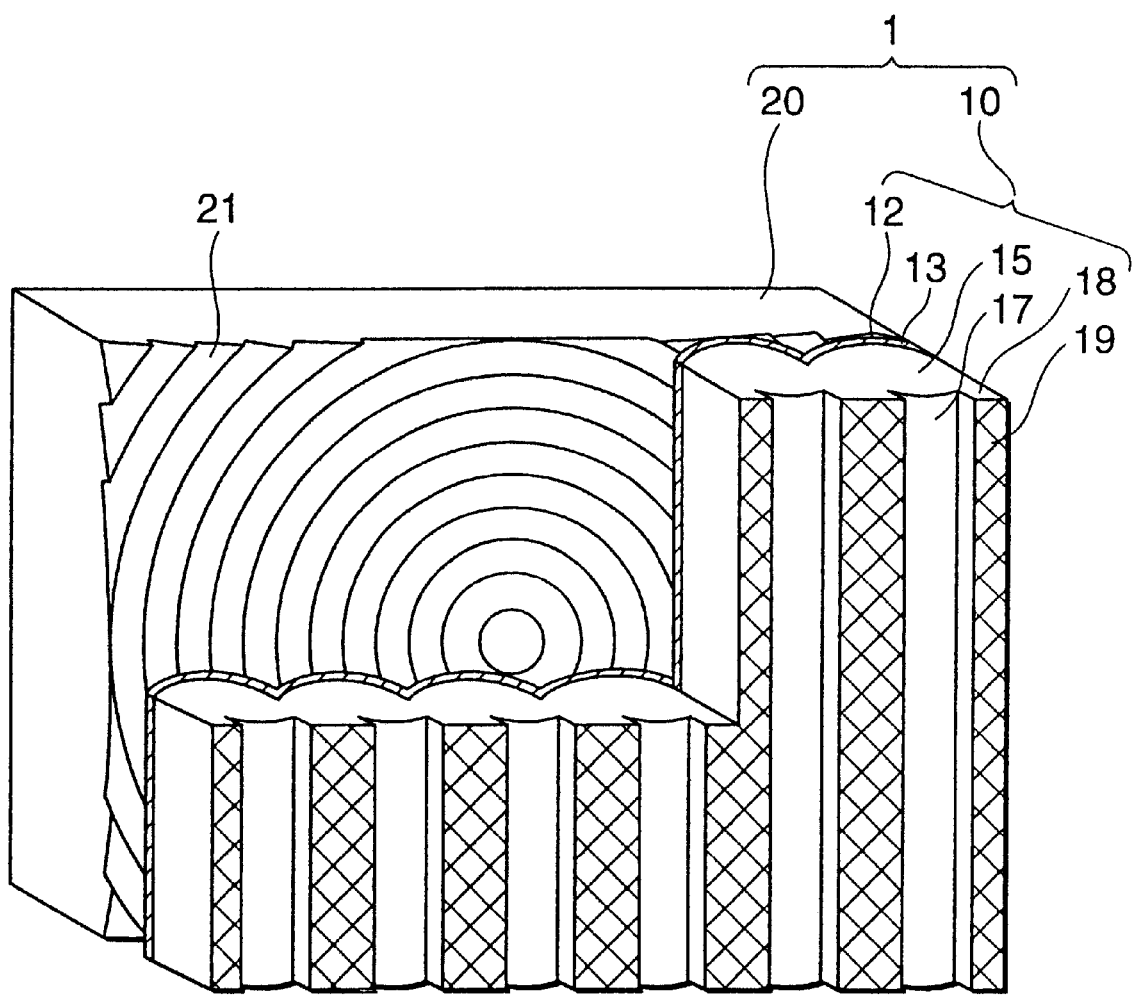
FIG. 1 is a typical perspective view of a rear projection screen employing a lenticular lens sheet in a first embodiment according to the present invention.

Referring to FIG. 1, a rear projection screen 1 comprises, in combination, a lenticular lens sheet 10 in a first embodiment according to the present invention and a Fresnel lens sheet 20. The rear projection screen 1 and an optical image source, not shown, including three CRTs for projecting red, green and blue images on the rear projection screen 1 constitute a rear projection television system. The Fresnel lens sheet 20 may be a sheet or film having an exit surface provided with stepped setbacks 21 so as to have the optical properties of a lens. The rear projection screen 1 improves the uniformity of the brightness of images.

Lenticular Lens Sheet in First Embodiment

Figure 2:
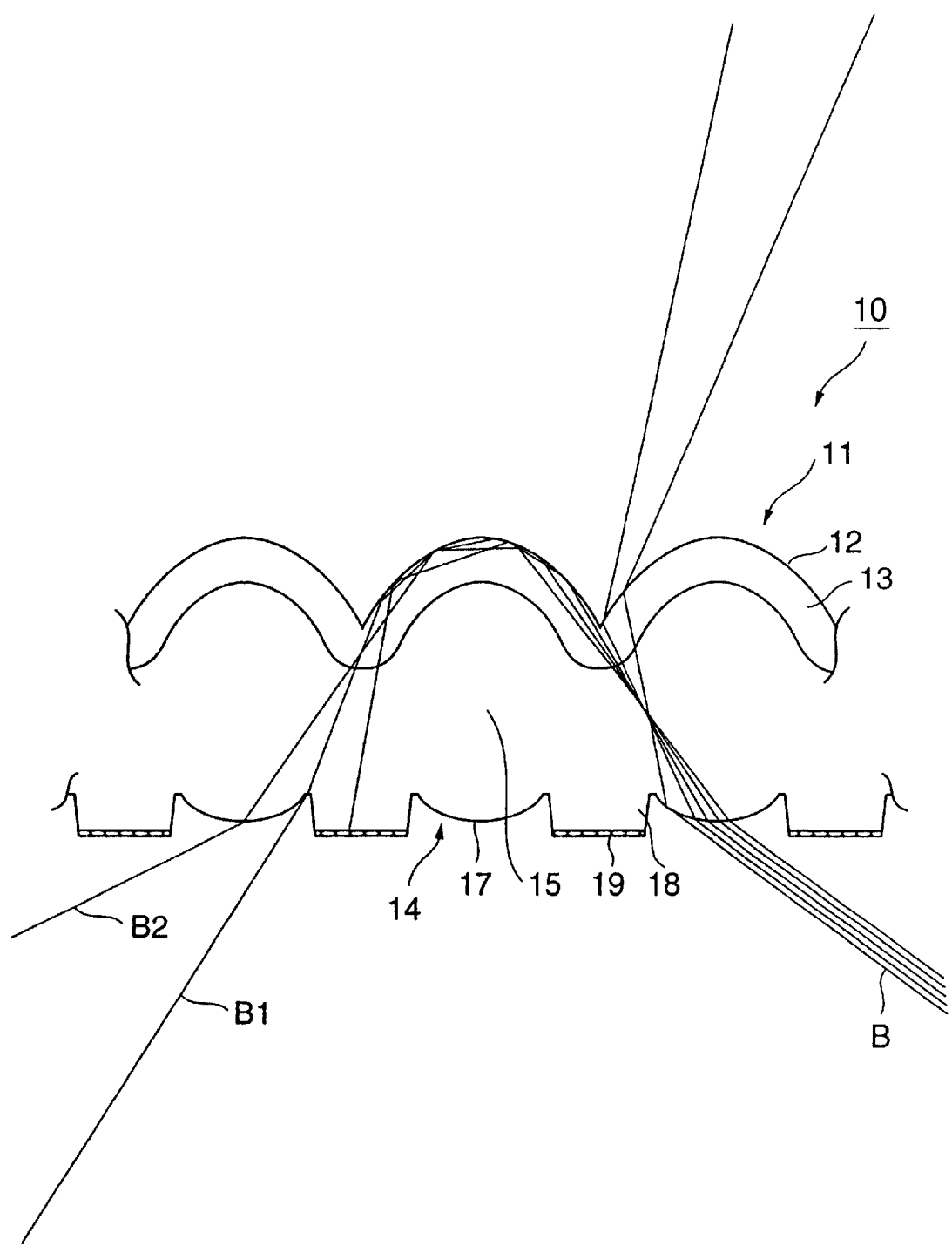
FIG. 2 is a fragmentary, enlarged, typical end view of the lenticular lens sheet shown in FIG. 1.
Figure 3:
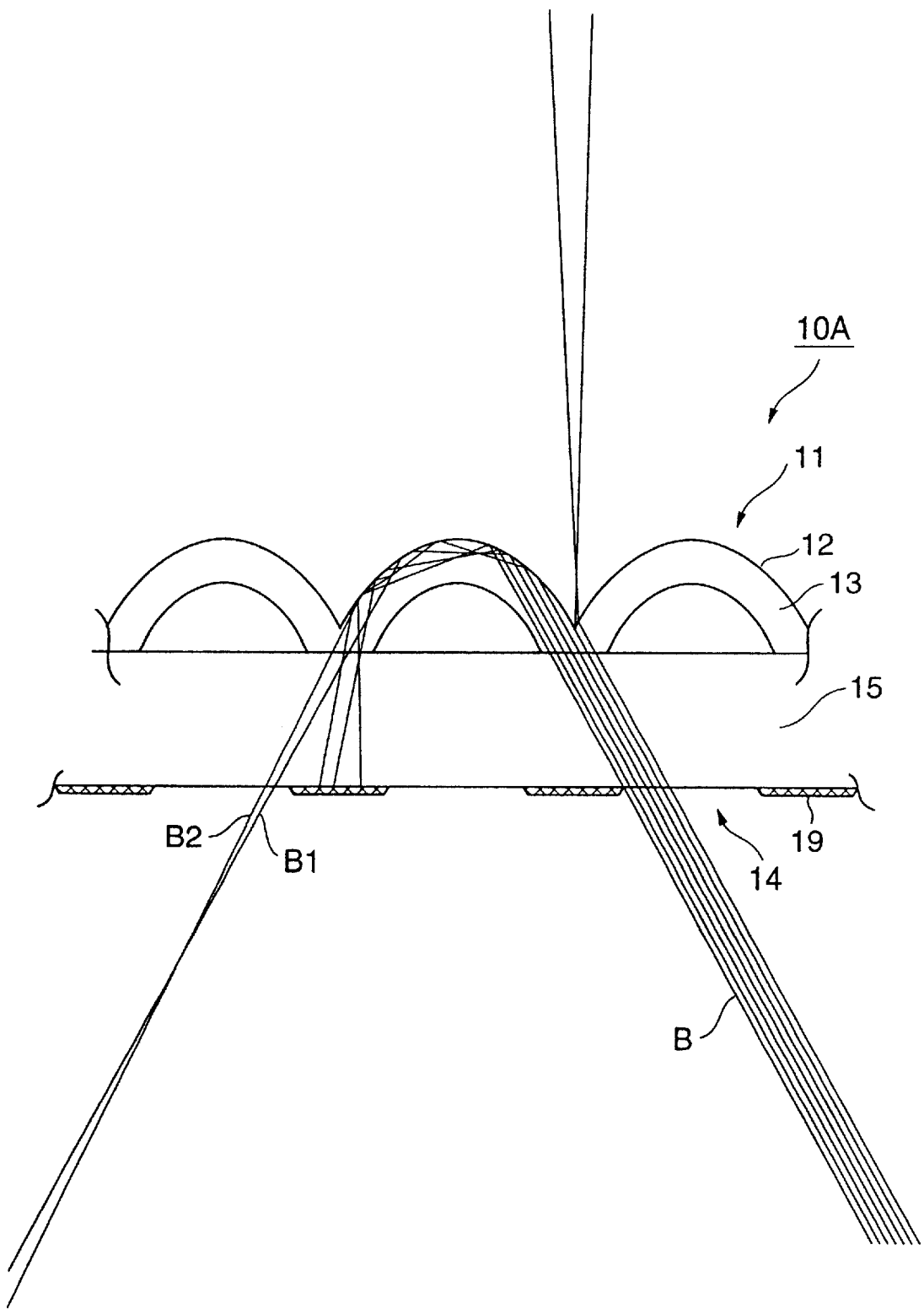
FIG. 3 is a fragmentary, enlarged, typical end view of a lenticular lens sheet in a second embodiment according to the present invention.

Referring to FIG. 2, the lenticular lens sheet 10 having an entrance surface 11 and an exit surface 14 comprises a base part 15, an entrance lens part 12 forming the entrance surface 11 and having an array of a plurality of entrance convex lens elements capable of gathering light rays, an exit lens part 17 forming the exit surface 14 and formed near a light gathering regions in which light rays refracted by the entrance convex lens elements of the entrance lens part 12 gather, ridges 18 formed in light-nongathering regions on the exit surface 14, and a light absorbing layer 19 formed on the surfaces of the ridges 18. Light rays refracted by the entrance convex lens elements of the entrance lens part 12 do not gather in the light-nongathering regions The entrance lens part 12 is formed integrally with the base part 15. The entrance lens part 12 and the base part 15 may separately be formed and may be joined together as shown in FIG. 3. A tinted layer 13 is formed at least in a part of the entrance lens part 12 near the entrance surface 11. The tinted layer 13 has a first function to enhance contrast in images displayed on the lenticular lens sheet 10, and a second function to suppress the generation of stray light rays. Those functions of the tinted layer 13 will be described later.

Lenticular Lens Sheet in Second Embodiment

Referring to FIG. 3, a lenticular lens sheet 10A in a second embodiment according to the present invention has an entrance surface 11 and an exit surface 14, and comprises a base part 15, an entrance lens part 12 having an array of a plurality of entrance convex lens elements capable of gathering light rays, and a light absorbing layer 19 formed in light-nongathering regions on the exit surface 14. Light rays refracted by the entrance convex lens elements of the entrance lens part 12 do not gather in the light-nongathering regions. The entrance lens part 12 and the base part 15 are formed separately and joined together. The entrance lens part 12 may be formed integrally with the base part 15. A tinted layer 13 is formed at least in a part of the entrance lens part 12 near the entrance surface 11 The tinted layer 13 has a first function to enhance contrast in images displayed on the lenticular lens sheet 10, and a second function to suppress the generation of stray light ray. Those functions of the tinted layer 13 will be described later.

Lenticular Lens Sheet in Third Embodiment

Figure 4:
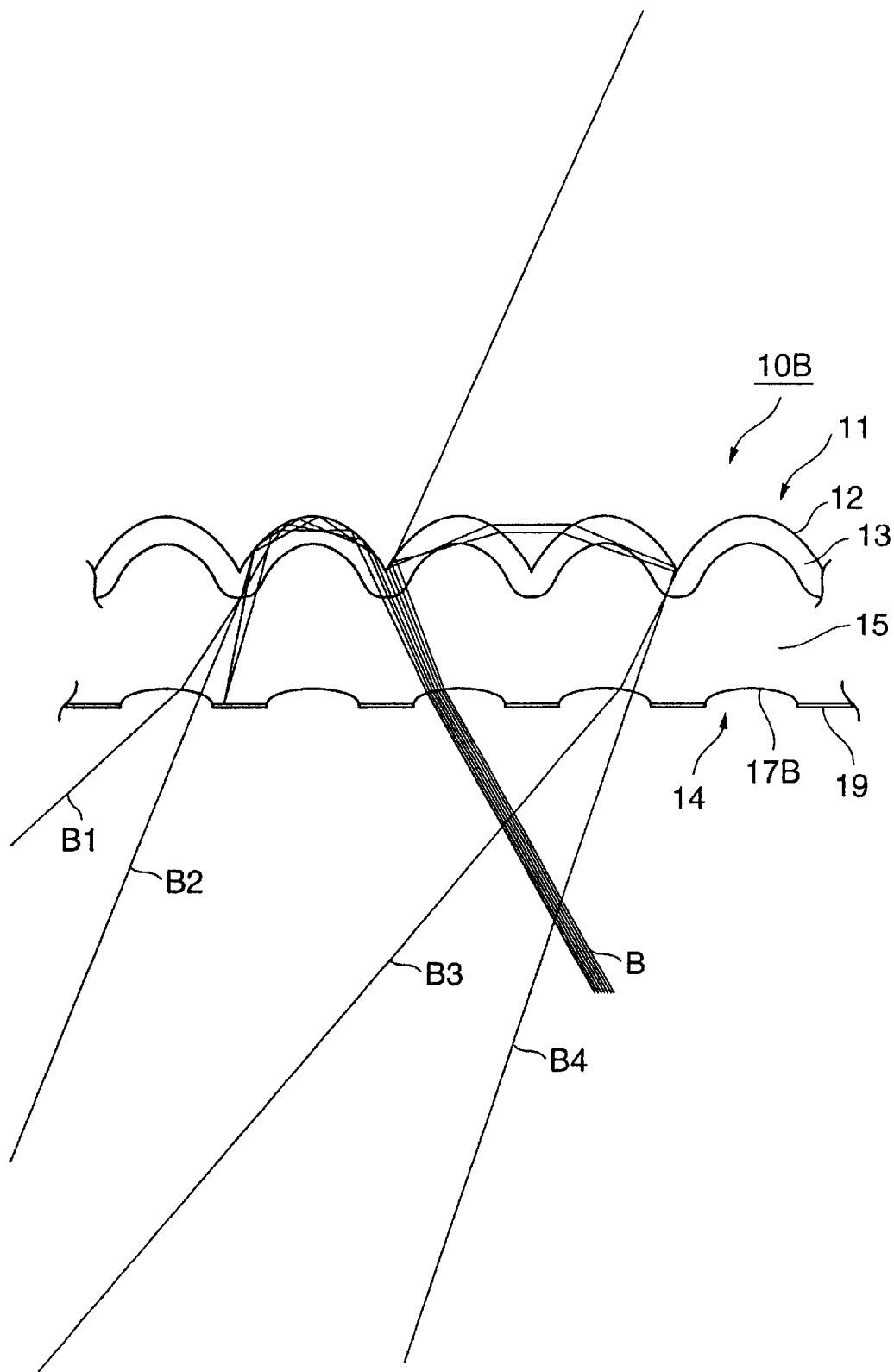
FIG. 4 is a fragmentary, enlarged, typical end view of a lenticular lens sheet in a third embodiment according to the present invention.

Referring to FIG. 4, a lenticular lens sheet 10B in a third embodiment according to the present invention is substantially similar in construction to the lenticular lens sheet 10 shown in FIG. 2, except that the lenticular lens sheet 10B in the third embodiment has an exit lens part 17B provided with exit concave lens elements. Since the exit lens part 17B provided with the exit concave lens elements is incapable of converging angle correcting function, the lenticular lens sheet 10B is applied to a projection system having a single image projecting device, such as an LCD. Generally, it is difficult to increase the black stripe ratio to increase diffusion angle and plate thickness in such a case. Therefore, in the lenticular lens sheet 10B in the third embodiment, the tinted layer 13 is formed along the surface of the entrance lens part 12 to prevent the deterioration of contrast in images due to external light. The tinted layer 13 has a first function to prevent the deterioration of contrast in images displayed on the lenticular lens sheet 10B, and a second function to suppress the generation of stray light rays. Those functions of the tinted layer 13 will be described below.

First Function of Tinted Layer

In the lenticular lens sheets 10, 10A and 10B shown in FIGS. 2, 3 and 4, the first function of the tinted layer 13 removes external light efficiently and improves contrast in images.

Figure 6:
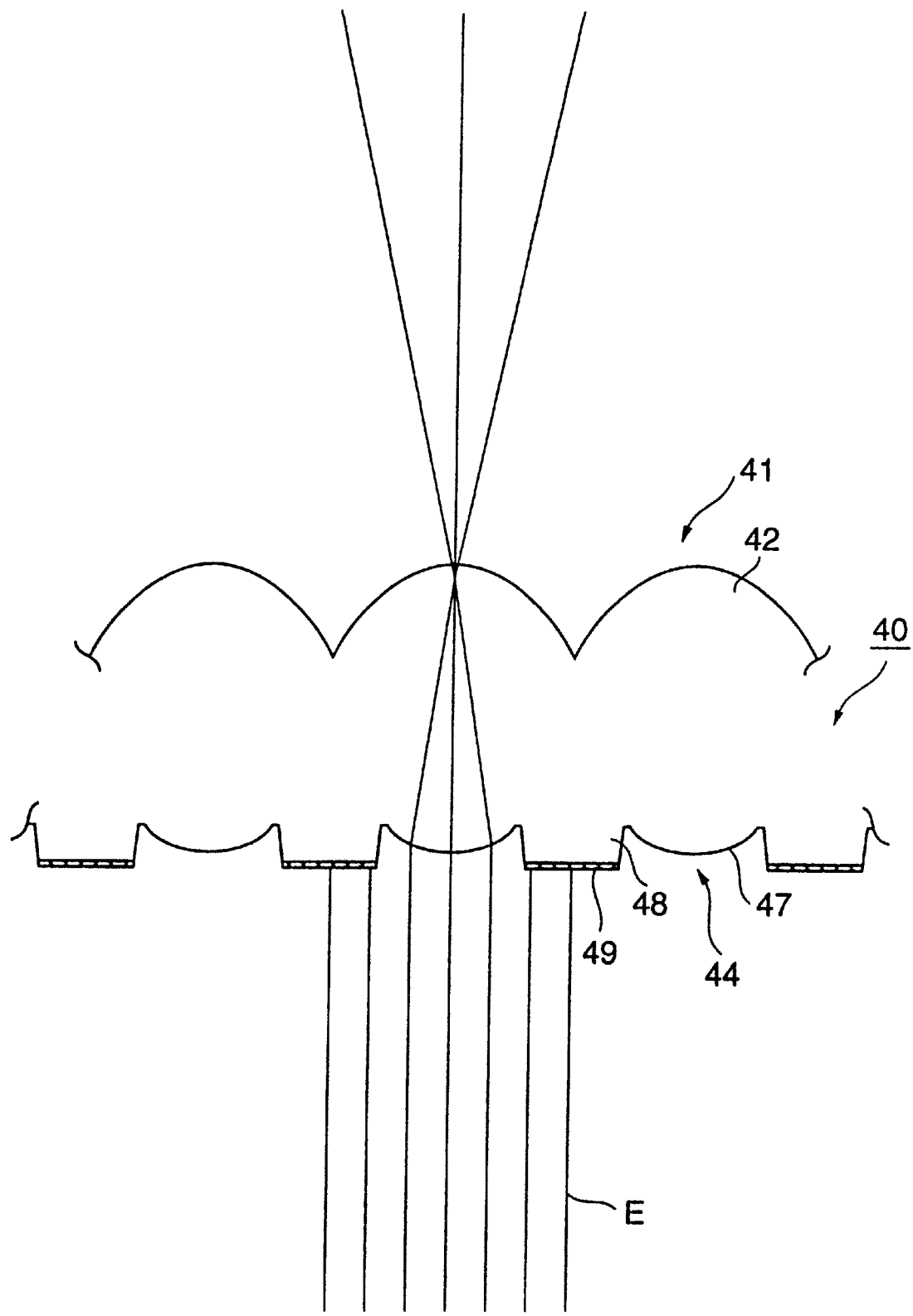
FIG. 6 is a fragmentary, enlarged, typical end view of a conventional lenticular lens sheet provided with black stripes.

As shown in FIG. 6, the conventional lenticular lens sheet 40 absorbs about half the amount of external light E fallen perpendicularly on the exit surface 44 by the black stripes 49. Light rays penetrated the exit lens elements of the exit lens part 47 travel through the lenticular lens sheet 40 and go out of the lenticular lens sheet 40 without undergoing total reflection. Therefore, the external light E has not been thought to be a cause to deteriorate contrast in images.

However, the ambient light falls on the exit surface of the lenticular lens sheet from all directions including oblique directions. External light rays B fallen obliquely on the exit surface of the lenticular lens sheet as shown in FIGS. 2 to 4 undergo total reflection in the entrance lens part 12 and travel out of the lenticular lens sheet through the adjacent exit lens elements of the exit lens part 17 in outgoing light rays B1 and B2. As shown in FIGS. 2 to 4, light rays fallen on the entrance lens part 12 at angles of incidence greater than the critical angle go out of the lenticular lens sheet after undergoing total reflection several times (two or three times) in the entrance lens part 12. Therefore, the contrast deteriorating effect of external light can efficiently be eliminated by the tinted layers 13 formed on the surfaces of the entrance lens parts 12 forming the entrance surfaces 11 of the lenticular lens sheets 10, 10A and 10B shown in FIGS. 2 to 4, respectively.

The capability of the lenticular lens sheets 10, 10A and 10B in displaying images in satisfactory contrast will be described in comparison with that of a lenticular lens sheet 60 of a tinted body type shown in FIG. 5.

Figure 5:
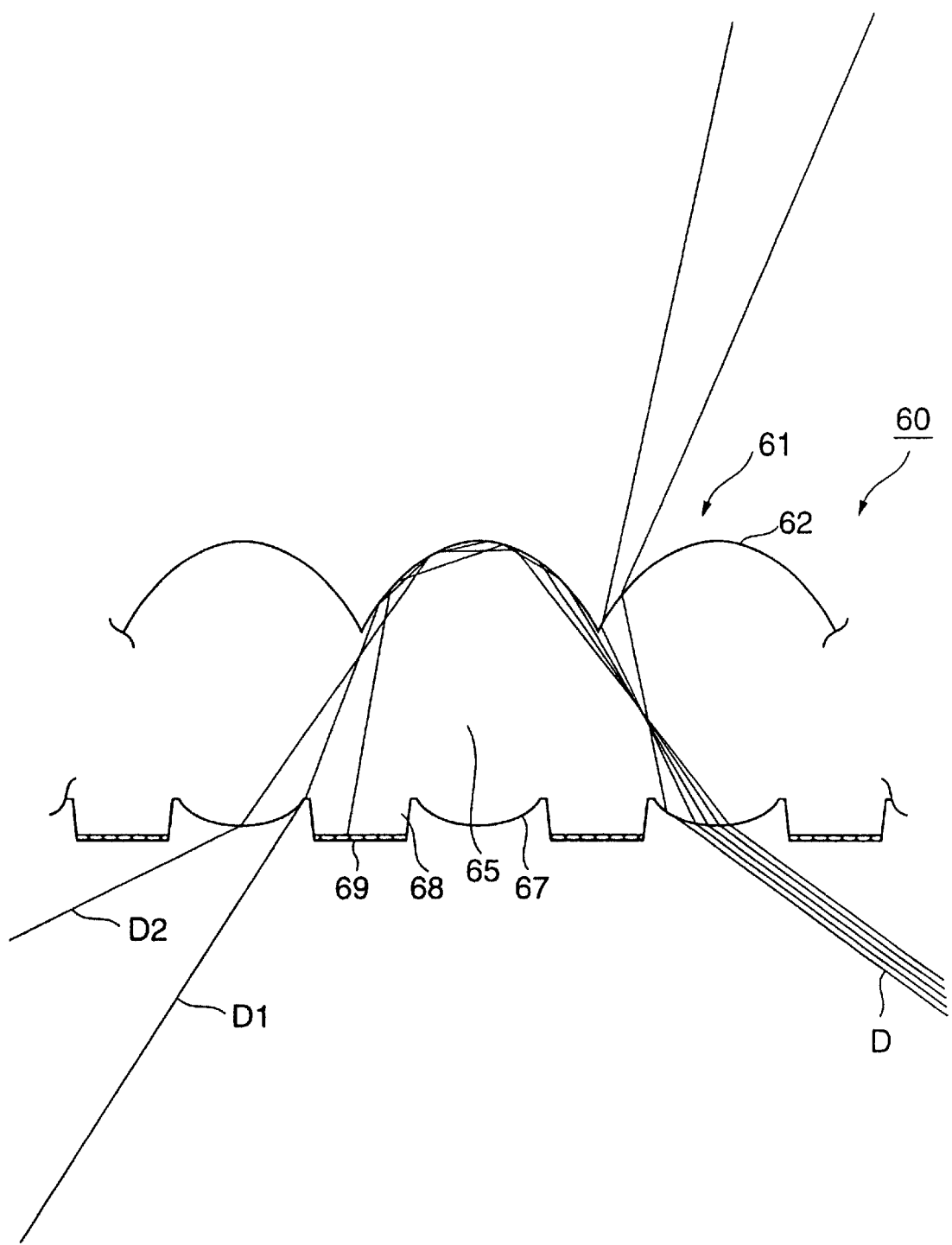
FIG. 5 is a fragmentary, enlarged, typical end view of a lenticular lens sheet of a tinted body type in a comparative example corresponding to the lenticular lens sheet in the first embodiment shown in FIG. 2 of assistance in explaining a first function of a tinted layer.

The lenticular lens sheet 60 shown in FIG. 5 is a double sided lenticular lens sheet having a tinted body part 65. External light rays D fallen on the lenticular lens sheet 60 from a viewing side travel through the body part 65 and undergo total reflection in an entrance lens part 62 forming an entrance surface 61. The external light rays D1 and D2 thus reflected travel out of the lenticular lens sheet 60 through the exit lens part 67 toward the viewer. The external light rays D are reflected repeatedly by the entrance convex lens elements of the entrance lens part 62.

Each of the lenticular lens sheets 10, 10A and 10B embodying the present invention and shown in FIGS. 2 to 4 is provided with the tinted layer 13 extending along the paths of the external light rays B reflected repeatedly in a total reflection mode in the entrance convex lens elements of the entrance lens part 12. Therefore the optical path length of the external light rays B in the tinted layer 13 is five to ten times greater than that of image light rays in the tinted layer 13, whereas the ratio of the optical path length of the external light rays D in the lenticular lens sheet 60 of a tinted body type to that of the image light rays in the same is about two to about three. Therefore, the lenticular lens sheets 10, 10A and 10B embodying the present invention shown in FIGS. 2 to 4 is capable of attenuating the external light rays B to reduce suppress the adverse effect of the reflected external light rays B without significantly reducing the intensity of the image light rays.

Second Function of Tinted Layer

The second function of the tinted layer 13 of each of the lenticular lens sheets 10, 10A and 10B embodying the present invention shown in FIGS. 2 to 4 is to eliminate stray light rays effectively. The second function is more effective when (1) the lenticular lens sheet has an exit lens parts and (2) the focal point of the entrance convex lens elements of the entrance lens part lie substantially on the exit surface.

Figure 8:
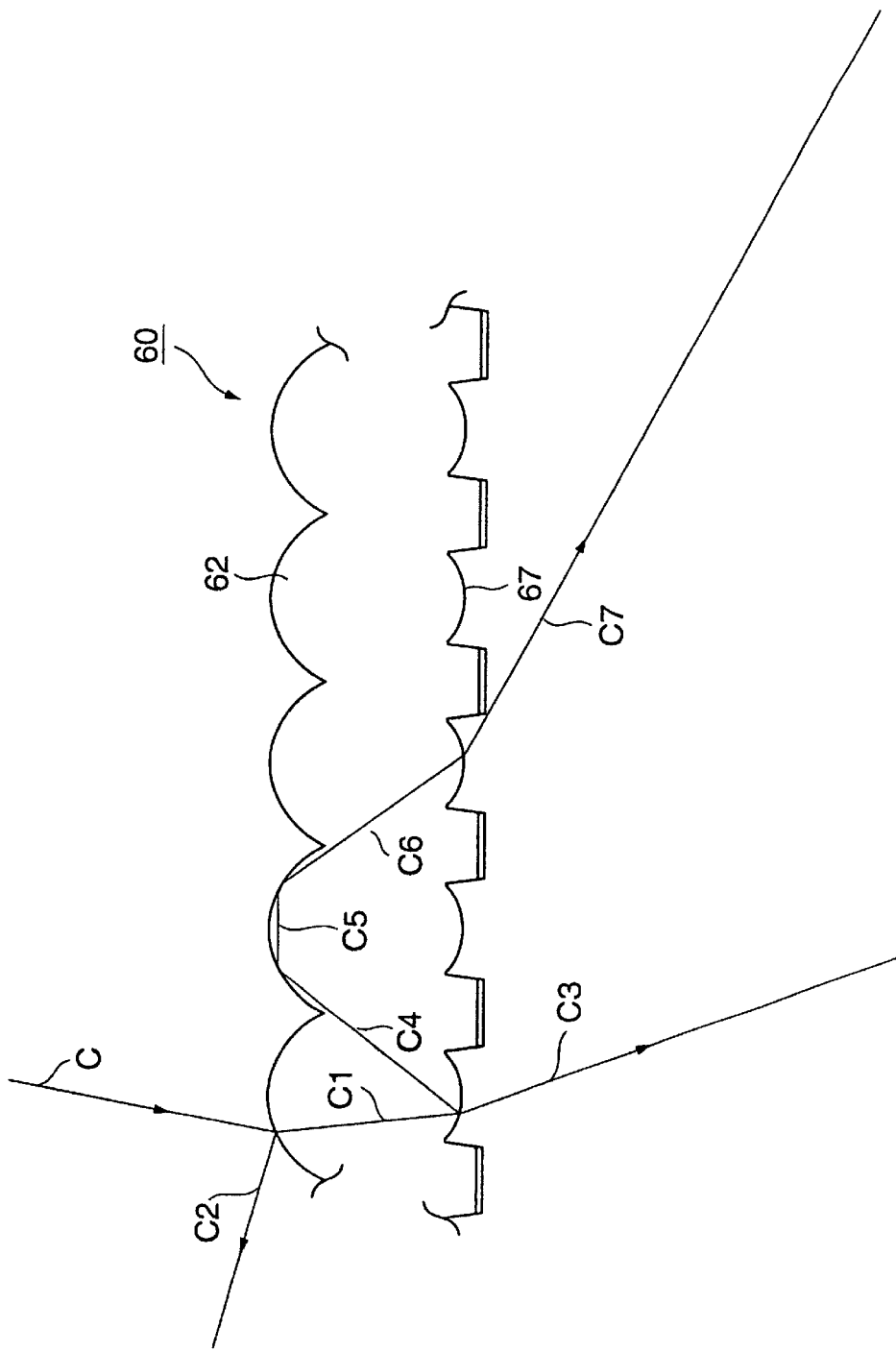
FIG. 8 is a fragmentary, enlarged, typical end view of a lenticular lens sheet in a comparative example corresponding to the first embodiment shown in FIG. 2 of assistance in explaining the second function of the tinted layer.

Referring to FIG. 8, when image light rays C falls on a conventional lenticular lens sheet 60 provided with black stripes, image light rays C2 equal to about 4% of the incident image light rays C is reflected by the entrance lens part 62 and image light rays C1 penetrate into the lenticular lens sheet 60. Image light rays C4 equal to about 4% of the image light rays C1 are reflected by the exit lens part, and image light rays C3 travels out of the lenticular lens sheet 60. The reflected light rays C4 are reflected several times in the lenticular lens sheet 60 in stray light rays C5 and C6 and travels out of the lenticular lens sheet 60 in light rays C7, which reduces contrast in images.

Figure 7:
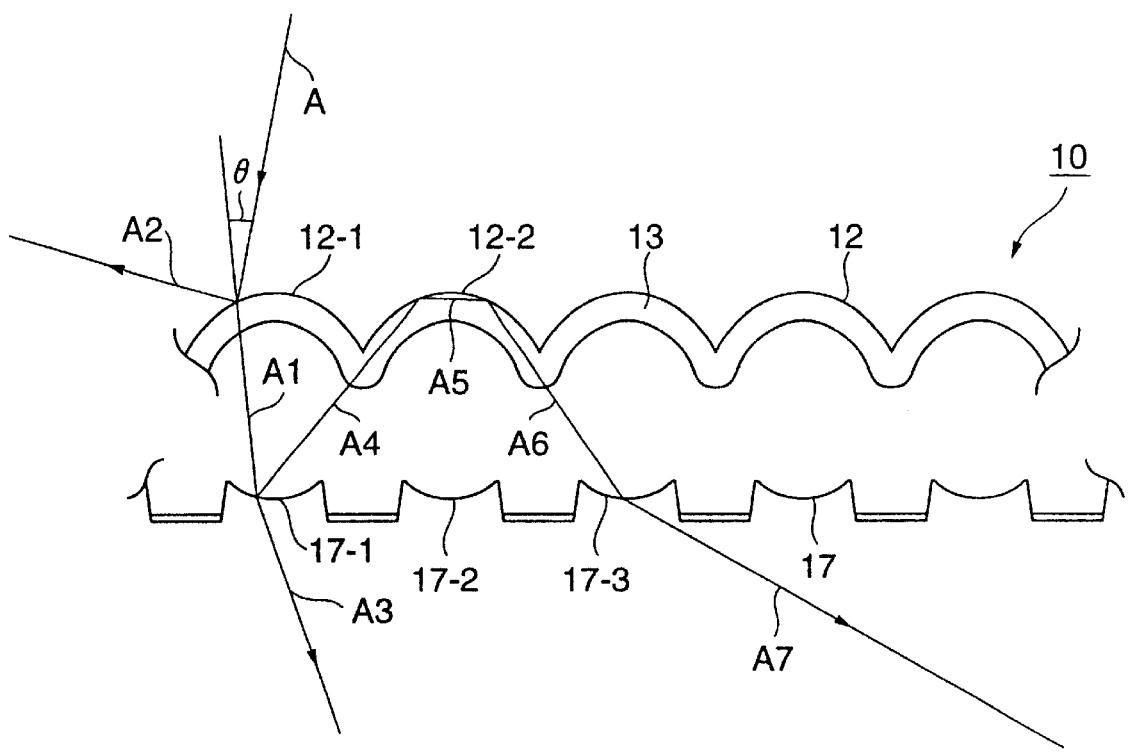
FIG. 7 is a fragmentary, enlarged, typical end view of assistance in explaining a second function of a tinted layer included in the lenticular lens sheet in the first embodiment.

The second function of the tinted layer 13 of the lenticular lens sheet 10 in the first embodiment shown in FIG. 2 will be described with reference to FIG. 7.

Image light rays A fall on the tinted layer 13 at an incident angle of θ of 10°. Generally, red (R) and blue (B) image light rays fall on the lenticular lens sheet at incident angles nearly equal to 10°. As shown in FIG. 7, the image light rays A are gathered by the entrance lens element 12-1 of the entrance lens part 12 on an inclined region of the exit lens element 17-1 of the exit lens part 17 in image light rays A1. Part of the image light rays A1 reflected by the exit lens element 17-1 in image light rays A4 toward the adjacent entrance convex lens element 12-2. The image light rays A4 undergo total reflection several times in image light rays A5 and A6, and the image light rays A6 travels out of the lenticular lens sheet 10 through the next exit lens element 17-3 in image light rays A7. Therefore, stray light rays can more effectively be eliminated by forming the tinted layer 13 along the surface of the entrance lens part 12 than by tinting the entire lenticular lens sheet as shown in FIG. 8.

Incidentally, image light rays that fall perpendicularly on the vertex of the entrance convex lens element of the entrance lens part 12, such as green (G) image light rays, are gathered by the entrance convex lens element of the entrance lens part 12 on the vertex of the exit lens element of the exit lens part 17. Therefore, the image light rays reflected by the exit lens element of the exit lens part travel reverse and goes out of the lenticular lens sheet 10 through the entrance convex lens element through which the image light rays penetrated into the lenticular lens sheet 10.

The second function of the tinted layer 13 of the lenticular lens sheet 10B in the third embodiment shown in FIG. 4 will be described hereinafter with reference to FIG. 9. The lenticular lens sheet 10B has the exit lens part 17B provided with the concave exit lens elements. Since the exit lens part 17B of the lenticular lens sheet 10B is unable to exercise a color correcting effect, the lenticular lens sheet 10B is applied to a rear projection television system using a single image light source, such as an LCD or a DLP (Digital Light Processing).

Figure 9:
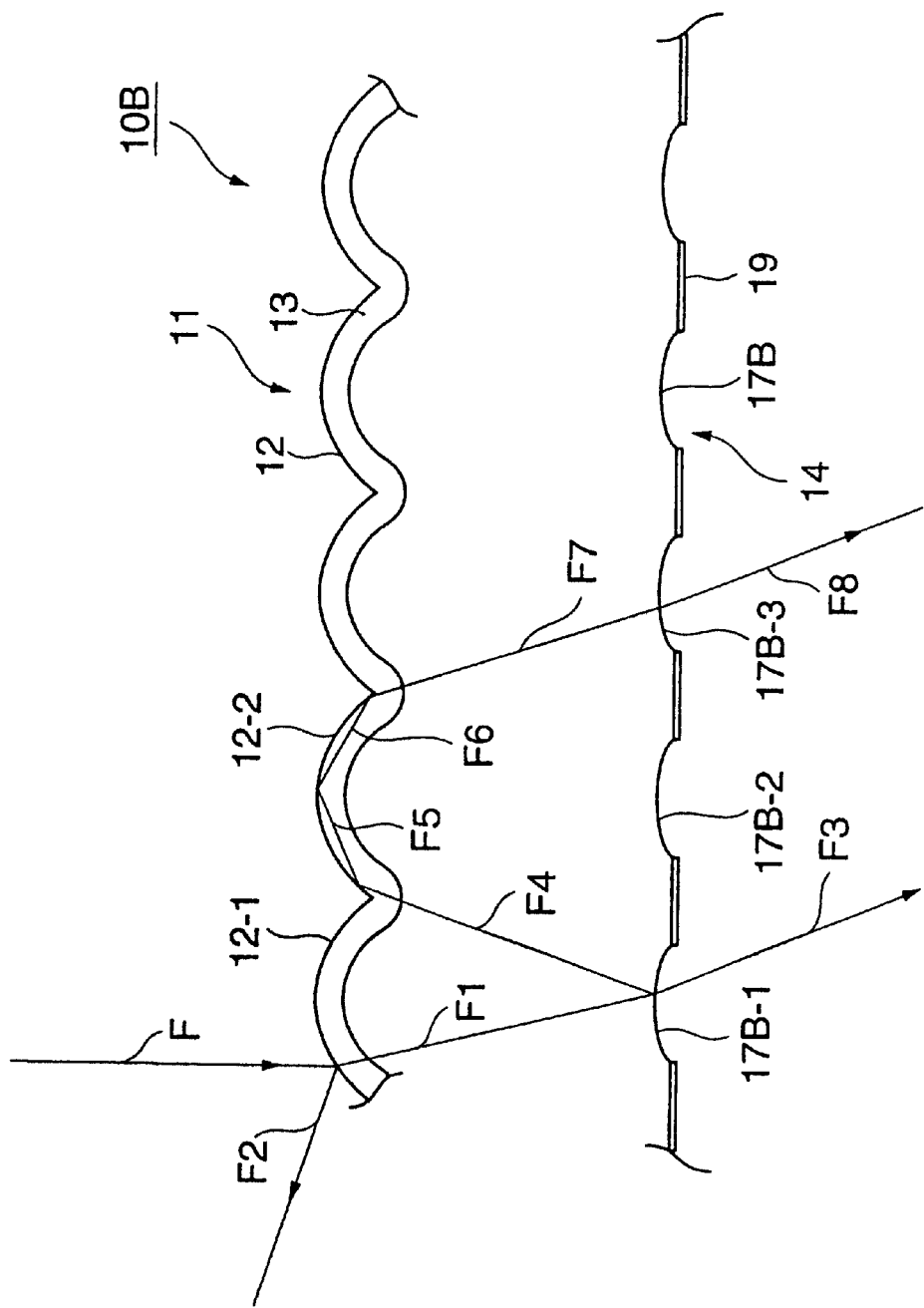
FIG. 9 is a fragmentary, enlarged, typical end view of a lenticular lens sheet in a third embodiment according to the present invention of assistance in explaining the second function of the tinted layer.

Referring to FIG. 9, image light rays F fall on the lenticular lens sheet 10B perpendicularly to the entrance surface 11. In the lenticular lens sheet 10B, the focal point of the entrance convex lens element 12-1 lies on the inner side of the exit lens element 17B-1. Therefore, the image light rays F fallen on a left inclined region, as viewed in FIG. 9, of the entrance convex lens element 12-1 of the entrance lens part 12 go out of the lenticular lens sheet 10B through an inclined region of the corresponding exit lens element 17B-1 in image light rays F3. Part of image light rays F1 penetrated into the lenticular lens sheet 10B equal to about 4% of the image light rays F1 are reflected by the exit lens element 17B-1 in image light rays F4 toward the adjacent entrance convex lens element 12-2. The reflected image light rays F4 are reflected repeatedly in a total reflection mode by the entrance convex lens element 12-2 in image light rays F5, F6 and F7, and go out of the lenticular lens sheet 10B through the next exit lens element 17B-3 in image light rays F8.

As shown in FIG. 9, stray light rays can more effectively be eliminated by forming the tinted layer 13 along the surface of the entrance lens part 12 than by tinting the entire lenticular lens sheet.

As apparent from the foregoing description, the entrance lens parts 12 forming the respective entrance surfaces 11 of the lenticular lens sheets 10, 10A and 10B embodying the present invention shown in FIGS. 2 to 4 are capable of efficiently absorbing the external light rays B reflected therein in a total reflection mode. The external light rays B fallen at an incident angle θ on the exit surface 14 are reflected in a total reflection mode by the entrance lens part 12 toward the exit surface 14 and deteriorate contrast in images. The external light rays B can be absorbed by the tinted layer 13 formed along the lens surface of the entrance lens part 12 when the external light rays are reflected twice or more times. The external light ray absorbing effect of the tinted layer 13 is merely equivalent to that of the lenticular lens sheet of a tinted body type if the external light rays B are reflected only once in the lenticular lens sheet.

The angle of a portion of the entrance convex lens element of the entrance lens part 12 to the entrance surface 11 inclined at the greatest inclination must be greater than an angle that makes the portion of the entrance lens element of the entrance lens part 12 reflect light rays in a total reflection mode in a direction parallel to the light absorbing layer 19 surface 11 to reflect the external light rays B at least twice.

Figure 10:
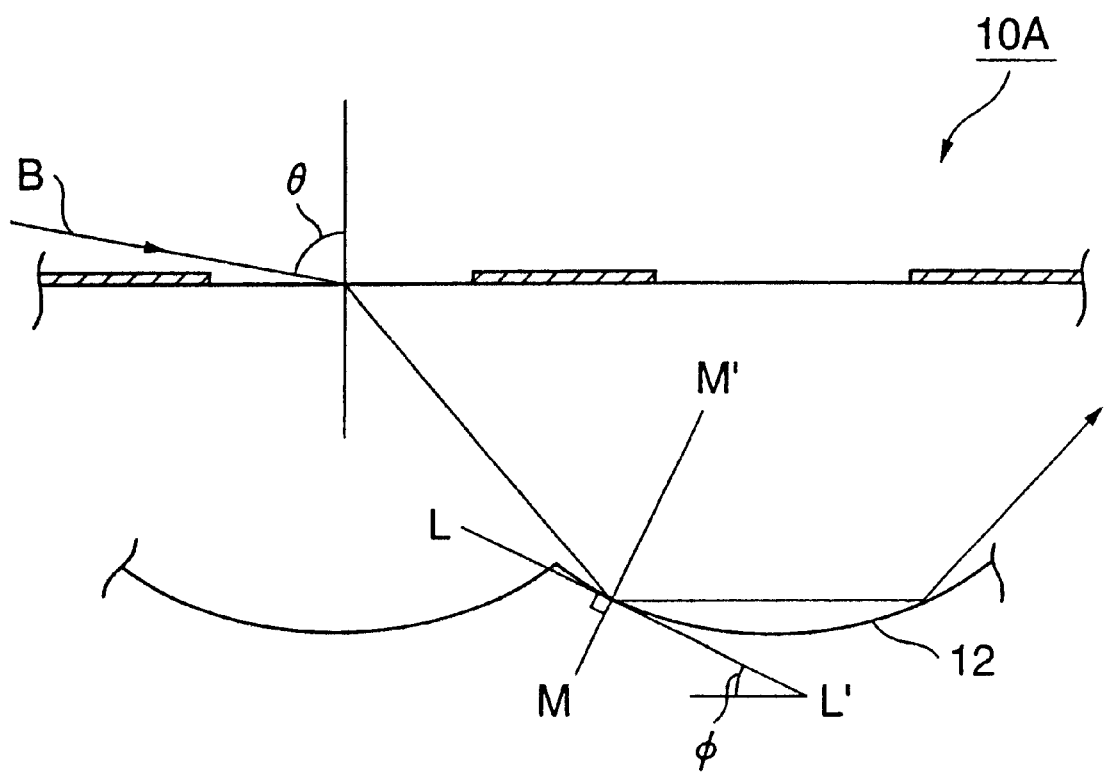
FIG. 10 is a fragmentary, enlarged, typical end view of assistance in explaining the relation between the angle of an entrance lens part included in the lenticular lens sheet in the second embodiment to a screen surface, and the incident angle of external light.

FIG. 10 illustrates conditions for reflecting the external light rays B at least twice by the single entrance convex lens element of the entrance lens part 12. The conditions are expressed by:

$$\phi = (\pi/4) - \arcsin[(\sin\theta)/n]$$

where n is the refractive index of the material forming the lenticular lens sheet 10A, φ is the angle of a tangent line to the entrance convex lens element of the entrance lens part 12 at a point where the external light rays B fall to a line parallel to the entrance surface 11, and θ is the incident angle of the external light rays B incident on the exit surface 14.

If the angle φ is not smaller than an angle $\phi_{90} = (\pi/4) - \arcsin[(\sin 90°)/n] = (\pi/4) - \arcsin(1/n)$, the effect of the present invention is available.

A method of forming the tinted layer 13 of each of the lenticular lens sheets 10, 10A and 10B embodying the present invention, the color, the color density, the size and the thickness of the tinted layer 13 will be explained hereinafter.

Method Forming Tinted Layer

The tinted layer 13 can be formed by mixing or dispersing a dye or fine particles of a pigment in a resin for forming each of the lenticular lens sheets 10, 10A and 10B.

Color of Tinted Layer

The tinted layer 13 may be tinted an achromatic color, such as gray, or a color capable of selectively absorbing or transmitting specific colors for controlling the balance of the three primary colors (red, green and blue).

Color Density of Tinted LAYER

The color density of the tinted layer 13 is higher than those of a portion of the lenticular lens sheet other than the tinted layer 13, i.e., the base part 15, and portions of the entrance convex lens elements of the entrance lens part 12 other than the tinted layer 13. It is preferable that the respective color densities of the base part 15 and portions of the entrance convex lens elements of the entrance lens part 12 other than the tinted layer 13 are naught or are limited to a very low value to suppress the adverse effect of the external light rays without significantly reducing the transmittance to the image light rays projected by the image light source.

More concretely, it is preferable that the tinted layer 13 is colored in a color density such that the transmittance of each of the lenticular lens sheets 10, 10A and 10B is in the range of 40% to 70%. Whereas the transmittance to the image light rays increases, the intensity of the external light rays reflected in a total reflection mode by the entrance lens part 12 toward the exit surface 14 increase to deteriorate contrast in images if the tinted layer 13 is tinted in a low color density such that the transmittance of the lenticular lens sheet is greater than 70%. The transmittance to the image light rays decreases and the relative intensity of the external light rays reflected by the exit lens part 17 increases to deteriorate contrast in images if the tinted layer 13 is tinted in a high color density such that the transmittance of the lenticular lens sheet is smaller than 40%.

Table 1 shows the relation between the transmittance of the lenticular lens sheet 10 in the first embodiment shown in FIG. 2 and contrast in images. Test lenticular lens sheets similar in construction to the lenticular lens sheet 10 shown in FIG. 2 and respectively having tinted layers 13 of different color densities were made, and the transmittance and the reflectance of the test lenticular lens sheets were measured by a haze meter (HR-100 available from murakami Shikisai Gijutsu Kenkyu-sho), in which the incident angle of image light rays was 45°. Measured values of the transmittance, the reflectance and the transmittance reflectance ratio are tabulated in Table 1.

TABLE 1

| Transmittance (%) | 45 | 53 | 61 | 68 | 76 |
|---|---|---|---|---|---|
| Reflectance (%) | 5.0 | 5.4 | 5.6 | 5.8 | 8.5 |
| Transmittance/Reflectance | 9.0 | 9.8 | 10.9 | 11.7 | 8.9 |

As obvious from Table 1, the transmittance of the lenticular lens sheet 10 increases as the color density of the tinted layer 13 decreases. The reflectance increases sharply after the transmittance increases beyond 70%, which is considered to be due to the incapability of the tinted layer 13 of an excessively low color density in properly absorbing the external light rays.

The lenticular lens sheet 10 do not absorb external light rays reflected by the exit surface 14 on the viewing side. Therefore, the transmittance reflectance ratio decreases as the color density increases to decrease the transmittance. Accordingly, it is preferable to tint the tinted layer 13 in a color density such that the transmittance is in the range of 40% to 70%.

When the transmission LCD is used as an image light source, the reduction of the transmittance is limited because the output capacity of the transmission LCD is not very large. Therefore, it is preferable that the tinted layer 13 is tinted in a color density such that the transmittance is in the range of 45% to 60%.

Size of Tinted Layer

The thickness of the tinted layer 13 is not less than 0.05 times the pitch of the entrance convex lens elements of the entrance lens part 12, more preferably, in the range of 0.05 to 1.0 times the pitches of the entrance convex lens elements of the entrance lens part 12. Preferably, the thickness of the tinted layer 13 is not greater than half the thickness of the lenticular lens sheets 10, 10A and 10B. Those conditions are suitable for forming the tinted layer 13 so as to include most part of the paths of the reflected external light rays.

Figure 11:
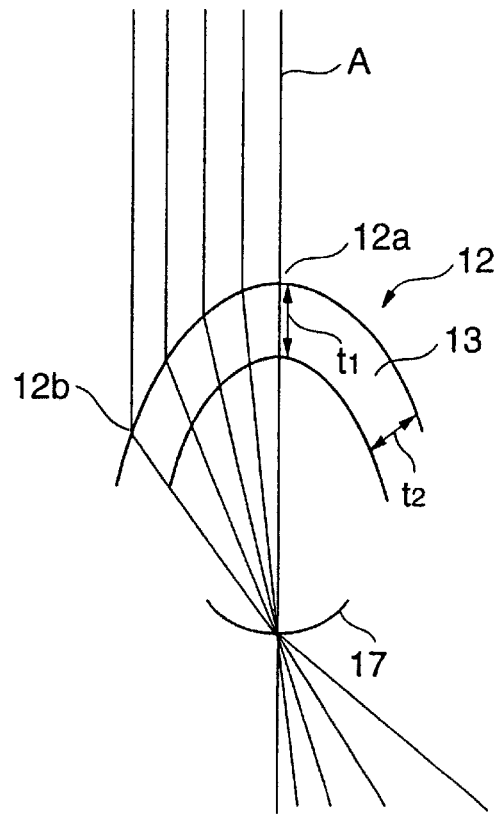
FIG. 11 is a view of assistance in explaining an optimum distribution of the thickness of a tinted layer included in the lenticular lens sheet in the first embodiment.

Preferably, the thickness $t_2$ of a portion of the tinted layer 13 corresponding to a peripheral portion of the convex lens element of the entrance lens part 12 is smaller than the thickness $t_1$, of a portion of the same corresponding to a central portion of the convex lens element ($t_1>t_2$) in FIG. 11. If the tinted layer 13 is formed in a uniform thickness, the length of image light rays incident on a peripheral portion 12b of the entrance convex lens element of the entrance lens part 12 is greater than that of the optical path of image light rays incident on the vertex 12a of the entrance convex lens element of the entrance lens part 12. Consequently, the image light rays incident on the peripheral portion 12b are absorbed more greatly than those incident on the vertex 12a, and the intensity of image light rays diffused in the range of a diffusion angle in the range of 30° to 40° is reduced.

Figure 12:
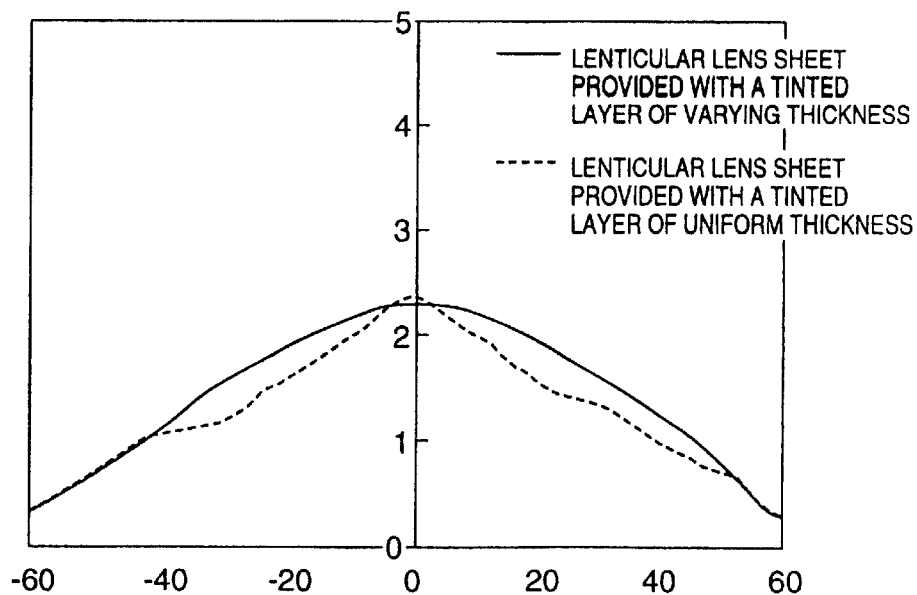
FIG. 12 is a graph comparatively showing light diffusing characteristics of a lenticular lens sheet in which the thickness of a tinted layer is uniform and the lenticular lens sheet in the first embodiment in which the thickness of the tinted layer decreases from a portion thereof corresponding to the vertex of an entrance convex lens element toward a portion of the same corresponding to the peripheral portion of the entrance convex lens element.

FIG. 12 is a graph comparatively showing light diffusing characteristics of a lenticular lens sheet in which the thickness of the tinted layer of the lenticular lens sheet is uniform and the lenticular lens sheet 10 in the first embodiment in which the thickness of the tinted layer decreases from a portion thereof corresponding to the vertex of an entrance convex lens element toward a portion thereof corresponding to the peripheral portion of the entrance convex lens element. In the lenticular lens sheet 10, the thickness of a portion of the tinted layer 13 corresponding to the peripheral portion of the entrance convex lens element is smaller than that of a portion of the same corresponding to the vertex of the entrance convex lens element. Therefore, the reduction of the intensity of the outgoing image light rays diffused in a range of a diffusion angle in the range of 30° to 40° can be suppressed.

Preferably, the thickness of the tinted layer 13 is determined according to the optical path length of the image light rays to achieve a desired design light diffusing characteristic.

Addition of Diffusing Material to Tinted Layer

Preferably, the tinted layer 13 contains a light diffusing material, such as glass beads or an organic crosslinked polymer. The light diffusing material concentration of the resin forming the lenticular lens sheets 10, 10A and 10B is on the order of 8% by weight. The light diffusing material has a function to diffuse the image light rays projected by the image light source in vertical planes.

The light diffusing material may be dispersed not only in the tinted layer 13 but may also be dispersed in the baser part 15. It is preferable that the light diffusing material concentration of the base part 15 is small because the external light rays are diffused before reaching the tinted layer 13 by the base part 15 and reflected toward the exit surface if the light diffusing material concentration of the base part 15 is large. Preferably, the light diffusing material concentration $C_1$ of the tinted layer and the light diffusing material concentration $C_0$, of the base part 15 meet an inequality: $0 \leq C_0 < C_1$.

In each of the lenticular lens sheets 10, 10A and 10B embodying the present invention and shown in FIGS. 2 to 4, the surface of the exit lens part 17 forming the exit surface 14 (the surface near light-gathering regions in the case of the lenticular lens sheet 10A shown in FIG. 3) is either a smooth surface or a matte surface. If the surface of the exit lens part 17 is a smooth surface, images displayed on the lenticular lens sheet gives a clear sensation, any transparent flat panel need not be disposed in front of the rear projection screen, and images can be displayed in a satisfactory picture quality because images are not spoiled by the reflection of matters reflected by the entrance surface 11 on the flat panel. When the surface of the exit lens part 17 forming the exit surface 14 (the surface near light-gathering regions in the case of the lenticular lens sheet 10A shown in FIG. 3) is a smooth surface, an antireflection layer, a low-reflection layer and/or a polarizing filter layer may be formed on the surface of the exit lens part 17 (the surface near light-gathering regions in the lenticular lens sheet 10A shown in FIG. 3) to enhance contrast in images. A hard coating layer, an antiglare layer and or an antistatic layer may be formed on the surface of the exit lens part 17.

When the surface of the exit lens part 17 (the surface near light-gathering regions in the case of the lenticular lens sheet 10A shown in FIG. 3) is a matte surface, the matte surface has an antiglare characteristic and any reflection of matters is not formed on the matte surface.

Method of Manufacturing Lenticular Lens Sheet

Each of the lenticular lens sheets embodying the present invention and shown in FIGS. 2 to 4 is manufactured by using an entrance surface molding roll having a side surface of a shape complementary to the shape of the entrance surface 11 including the entrance lens part 12, and an exit surface molding roll having a side surface of a shape complementary to the shape of the exit surface 14 including the exit lens part 17 and the ridges 18. The entrance surface molding roll and the exit surface molding roller are disposed with their axes extended in parallel to each other. The lenticular lens sheet is manufactured by extruding a sheet of a tinted resin and a sheet of a transparent or lightly tinted resin tinted in a color density smaller than that of the tinted resin (may contain a light diffusing material) so that the sheet of the tinted resin is in contact with the entrance surface molding roll and the sheet of the transparent or lightly tinted resin is in contact with the exit surface molding roll. The lenticular lens sheet may be formed by extruding a sheet of a resin between the entrance surface molding roll and the exit surface molding roll, and by feeding a tinted film along the circumference of the entrance surface molding roll so that the tinted film is laminated to the sheet of the resin. The entrance lens part 12 of the lenticular lens sheet of the present invention may be formed of an ultraviolet curable resin on the base part 15.

Lenticular Lens Sheets in Other Embodiments

Figure 13A:
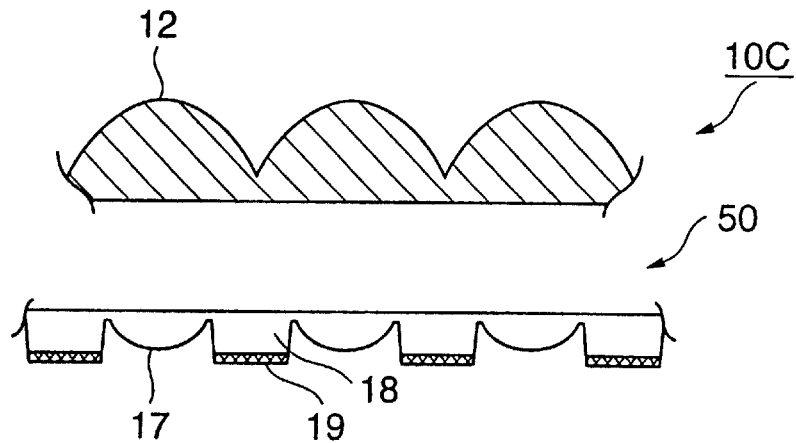
FIGS. 13A, 13B and 13C are fragmentary, enlarged, typical end views of lenticular lens sheets in fourth, fifth and sixth embodiments according to the present invention, respectively.
Figure 13B:
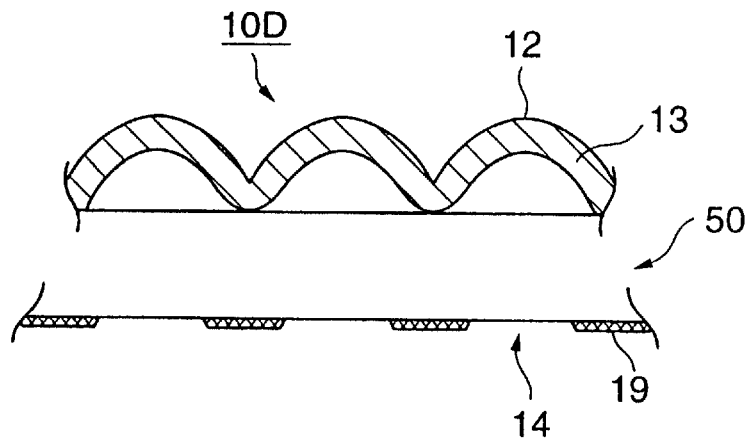
Figure 13C:
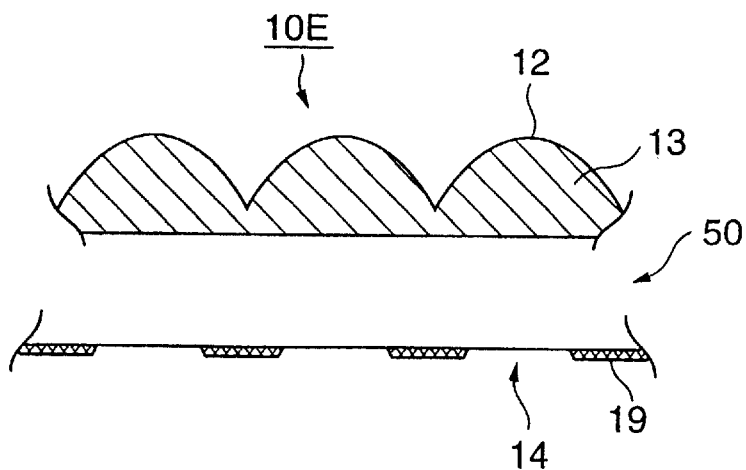

FIGS. 13A, 13B and 13C show lenticular lens sheets 10C, 10D and 10E in fourth, fifth and sixth embodiments according to the present invention, respectively. Each of the lenticular lens sheets 10C, 10D and 10E has an entrance lens part 12 formed of a tinted ultraviolet curable resin on a base part 50.

The lenticular lens sheet 10C shown in FIG. 13A is formed by forming an entrance lens part 12 of a tinted ultraviolet curable resin on the entrance surface of a base part 50, and forming the exit lens part 17, ridges 18 and a light absorbing layer 19 on the exit surface of the base part 50. If the lenticular lens sheet 10C is to be used in combination with a single image light source, such as an LCD not requiring a converging angle correcting function, the exit lens part 17 may be provided with concave exit lens elements 17B as shown in FIG. 4.

The lenticular lens 10D shown in FIG. 13B is formed by forming an entrance lens part 12 on the entrance surface of a base part 50, forming a tinted layer 13 of a tinted ultraviolet curable resin along the surface of the entrance lens part 12, and forming a light absorbing layer 19 on the exit surface of the base part 50.

The lenticular lens 10E shown in FIG. 13C is formed by forming an entrance lens part 12 of a tinted ultraviolet curable resin on the entrance surface of a base part 50, and forming a light absorbing layer 19 on the exit surface of the base part 50.

Figure 14A:
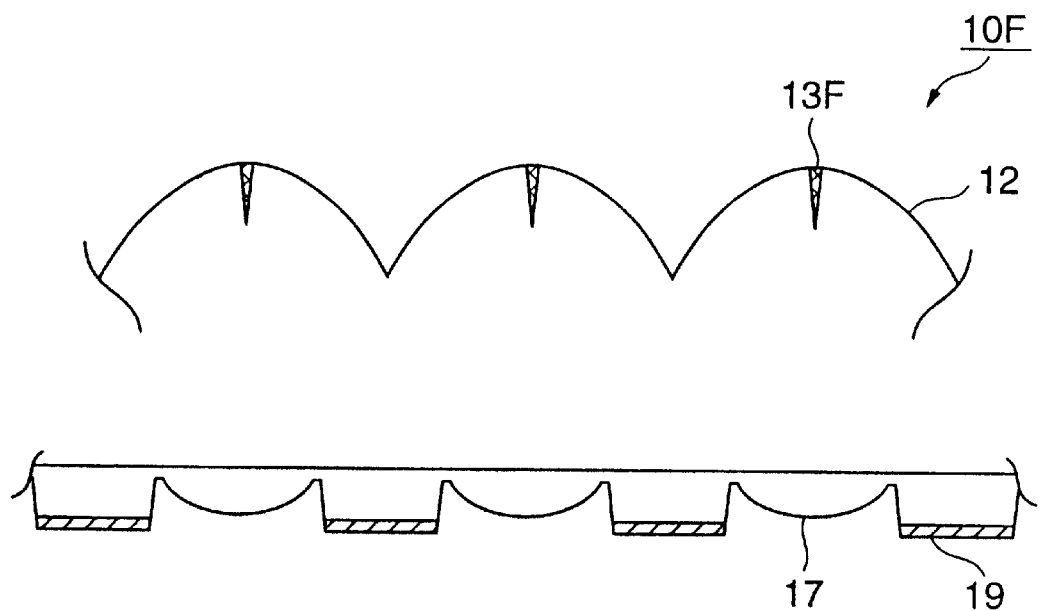
FIGS. 14A and 14B are fragmentary, enlarged, typical end views of lenticular lens sheets in seventh and eighth embodiments according to the present invention, respectively.
Figure 14B:
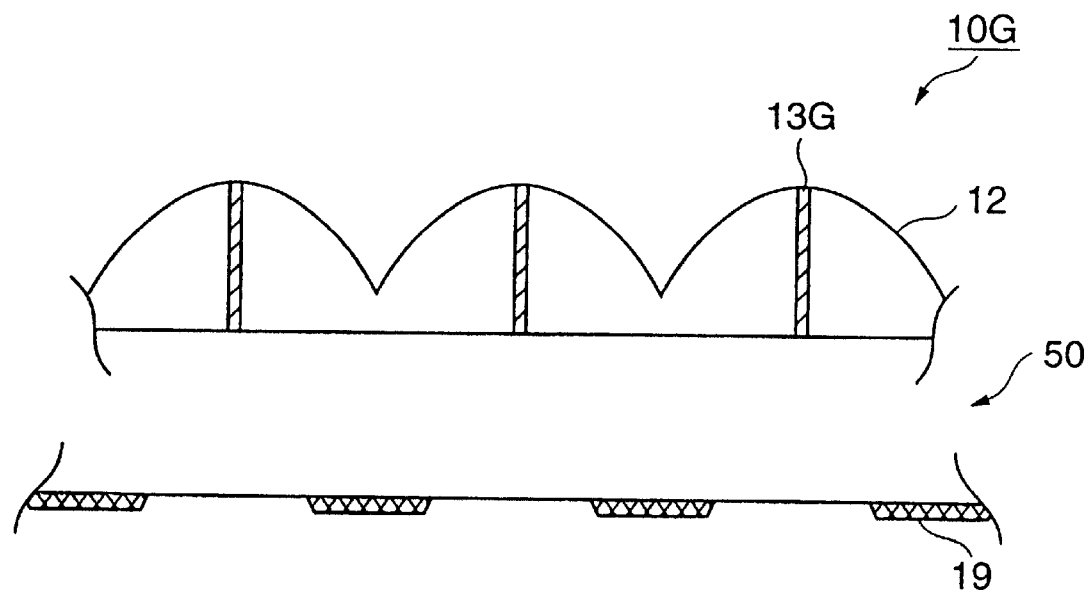

FIGS. 14A and 14B show lenticular lens sheets 10F and 10G in seventh and eighth embodiments according to the present invention, respectively. The lenticular lens sheets 10F and 10G have entrance lens parts 12 including entrance convex lens elements provided in portions around vertices thereof with tinted layers 13F and 13G, respectively.

The tinted layers 13F of the lenticular lens sheet 10F shown in FIG. 14A has the shape of a wedge.

The entrance lens part 12 of the lenticular lens sheet 10G shown in FIG. 14B includes entrance convex lens elements provided in middle portions including the vertices thereof with the tinted layers 13G, respectively. The tinted layers 13G are flat.

Rear Projection Screens

FIGS. 15A to 15D show rear projection screens 1A, 1B, 1C and 1D in other embodiments according to the present invention, respectively. Each of the rear projection screens 1A, 1B, 1C and 1D employs the lenticular lens sheet 10, 10H, and a front panel 30A, 30B, 30C and 30D disposed on the exit side of the lenticular lens sheet 10.

Most lenticular lens sheets are formed of a material containing a light diffusing material to provide the lenticular lens sheets with a vertical diffusion characteristic. Part of image light rays is diffused in stray light rays and the stray light rays go out of the lenticular lens sheet through exit lens elements other than intended ones. In the lenticular lens sheet 10 shown in FIG. 2, some of the external light rays B incident on the exit lens part 17 goes out of the lenticular lens sheet 10 through the entrance lens part 12 without being reflected in a total reflection mode by the entrance lens part 12.

In those embodiments, a tinted layer is formed on the exit side of a lenticular lens sheet formed of a resin containing a light diffusing material to prevent the deterioration of contrast attributable to the light diffusing material.

Figure 15A:
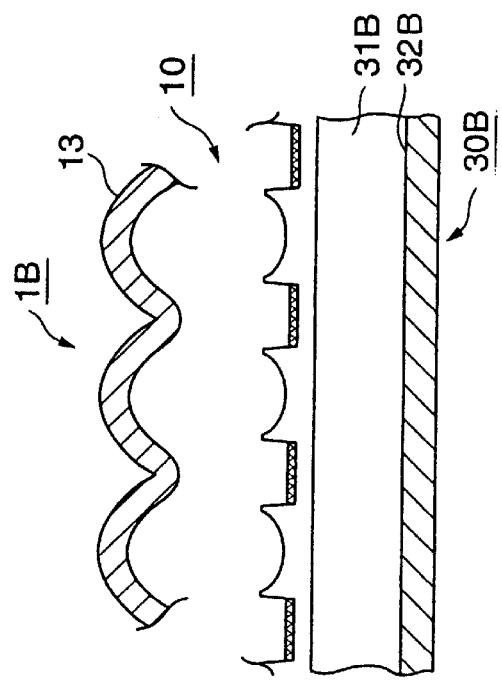
FIGS. 15A to 15D are fragmentary, enlarged, typical end views of rear projection screens in other embodiments according to the present invention, respectively.

The rear projection screen 1A shown in FIG. 15A is formed by disposing a front panel 30A in front of the lenticular lens sheet 10. The front panel 30A is formed entirely of a tinted base part 31A.

Figure 15B:
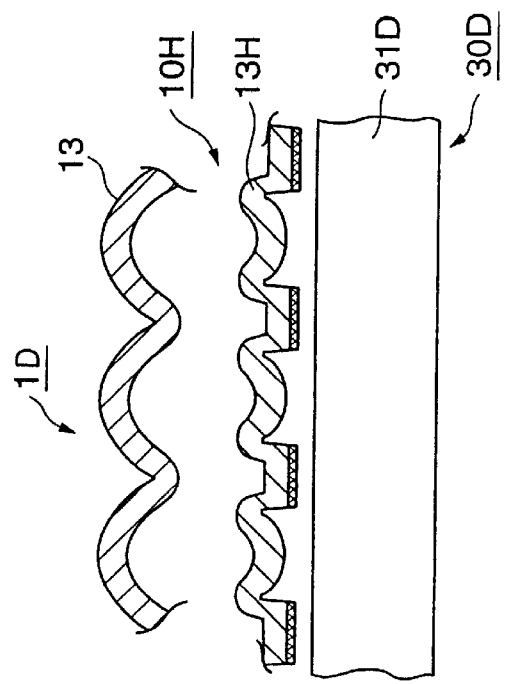

The rear projection screen 1B shown in FIG. 15B is formed by disposing a front panel 30B in front of the lenticular lens sheet 10. The front panel 30B comprises a transparent base part 31B and a tinted layer 32B formed on the exit surface of the base part 31B.

Figure 15C:
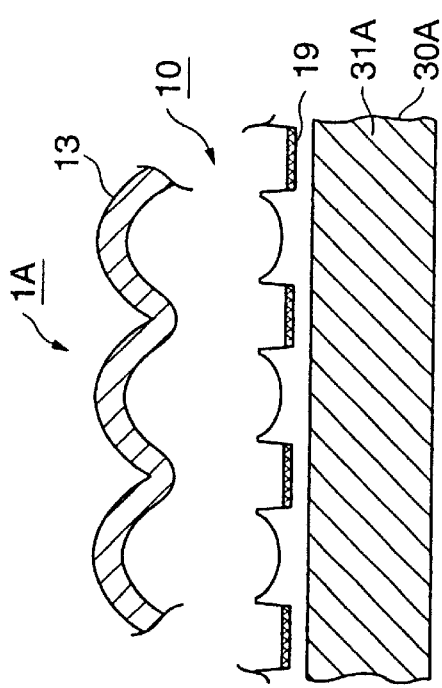

The rear projection screen 1C shown in FIG. 15C is formed by disposing a front panel 30C in front of the lenticular lens sheet 10. The front panel 30C comprises a transparent base part 31C and a tinted layer 32C formed on the entrance surface of the base part 31C.

Figure 15D:
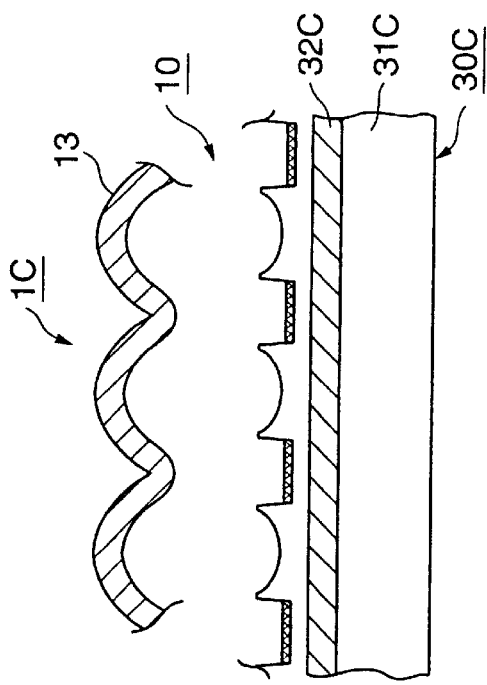

The rear projection screen 1D shown in FIG. 15D has a lenticular lens sheet 10H similar in construction to the lenticular lens sheet 10 and provided with a tinted exit lens part 13H forming an exit surface 14. The rear projection screen 1D is constructed by disposing a front panel 30D formed entirely of a transparent base part 31D in front of the lenticular lens sheet 10H. The front panels 30A, 30B. 30C and 30D may be provided with functional layers, such as an antireflection layer, a low-reflection layer, a polarizing filter layer, an antistatic layer, a glareproof layer and/or hard coating layer.

The present invention is not limited in practical application to the preferred embodiments specifically described above.

For example, the entrance lens part may be provided with a 'fly-eye lens sheet' capable of diffusing light in vertical planes instead of the lenticular lens elements.

The front panel may be provided with, for example, tinted lenticular lenses for vertical diffusion on its entrance surface. Since the lenticular lenses reflect unnecessary light rays, such as external light rays and stray light rays, in a total reflection mode, the formation of the tinted lenticular lenses on the entrance surface is more effective than uniformly tinting the front panel in displaying images in satisfactory contrast.

EXAMPLES

Lenticular lens sheets with black stripes in Example, Comparative examples 1 and 2 were made. The lenticular lens sheets were similar in construction to the lenticular lens sheet 10 shown in FIG. 2. In each of the lenticular lens sheets in Example, Comparative examples 1 and 2, the pitch of the lenticular lenses of the entrance lens part was 0.72 mm, the distance between the entrance lens part and the exit lens part was 0.87 mm, the lenticular lenses of the entrance and the exit lens part were convex lenticular lenses, and the black stripe ratio was 50%. The lenticular lens sheet in Example was provided with a tinted layer of 0.14 mm in thickness. The lenticular lens sheet in Comparative example 1 was provided with a lightly tinted layer, and the lenticular lens sheet in Comparative example 2 was not provided with any tinted layer. The properties of the lenticular lens sheets were measured. Measured results are tabulated in Table 2.

TABLE 2

|  |  | Example | Comp. Ex. 1 | Comp. Ex. 2 |
|---|---|---|---|---|
| Transmittance (%) |  | 68 | 76 | 67 |
| Reflectance (%) |  | 6.8 | 8.5 | 7.0 |
| Transmittance/-Reflectance |  | 11.7 | 8.9 | 9.5 |
| Contrast |  | 56 | 49 | 53 |
| Bright room | 0° | 5.7 | 5.8 | 5.7 |
| luminance (TV-OFF) | 40° | 5.7 | 6.9 | 6.3 |

Transmittance and reflectance were measured by the haze meter (HR-100 available from Murakami Shikisai Gijutsu Kenkyu-sho). Contrast was measured by displaying a monochromatic pattern on a rear projection screen formed by combining the lenticular lens sheet and a Fresnel lens sheet and incorporated into a rear projection television system. Contrast is expressed by luminance ratio, i.e., the ratio of the luminance of a white part of the monochromatic pattern to that of a black part in the central region of the rear projection screen. In the monochromatic patterns displayed on the rear projection screens employing the lenticular lens sheets in Comparative examples 1 and 2, the luminance of the black part is high and the luminance ratio is relatively small.

Bright room luminance (TV-OFF) is the luminance of a central region of the rear projection screen measured from directions at 0° and 40° to the rear projection screen in a bright room with the illuminating fluorescent lamps of the room turned on and the television projector disconnected from the power source. Since the television projector is disconnected from the power source, the bright room luminance is a measurement of the intensity of ambient light reflected from the rear projection screen. The lenticular lens sheets in Example and Comparative examples 1 and 2 are scarcely different from each other in the reflection of the ambient light in the 0°-direction. The reflection of the ambient light in the 40°-direction by the rear projection screen provided with the lenticular lens sheet in Example is smaller than that by the rear projection screens respectively provided with the lenticular lens sheets in Comparative examples 1 and 2.

As apparent from the foregoing description, according to the present invention, the reflection of external light can be suppressed without causing the significant reduction of the intensity of image light rays, images can be displayed in high contrast, and the rear projection television system employing the lenticular lens sheet of the present invention can be formed in a small thickness.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A lenticular lens sheet having an entrance surface and an exit surface, said lenticular lens sheet comprising:
    a base part;
    an entrance lens part forming the entrance surface and having an array of a plurality of convex lens elements capable of gathering light rays; and
    a light absorbing layer formed in light-nongathering regions in the exit surface in which light rays refracted by the convex lens elements do not gather,
    wherein a tinted layer is formed at least in a portion of the entrance lens part near the entrance surface, said tinted layer having wedge- or flat plane-shaped portions extending from the vertices of the convex lens elements into the entrance lens part.

2. The lenticular lens sheet according to claim 1 further comprising an exit lens part formed on the exit surface and having an array of a plurality of lens elements formed respectively in light-gathering regions in which light rays refracted by the convex lens elements of the entrance lens part gather.

3. The lenticular lens sheet according to claim 2, wherein the lens elements of the exit lens part are either convex or concave toward the exit surface.

4. The lenticular lens sheet according to claim 1, wherein the tinted layer contains a light diffusing material.

5. The lenticular lens sheet according to claim 2, wherein the tinted layer contains a light diffusing material.

6. A rear projection screen comprising:
    a lenticular lens sheet having an entrance surface and an exit surface; and
    a Fresnel lens sheet disposed opposite the entrance surface of the lenticular lens sheet facing an image light source,
    wherein the lenticular lens sheet has (1) a base part, (2) an entrance lens part formed on the entrance surface and having an array of a plurality of convex lens elements capable of gathering light rays, and (3) a light absorbing layer formed in light-nongathering regions in the exit surface in which light rays refracted by the convex lens elements do not gather, the entrance lens part being provided with a tinted layer in a portion of the entrance lens part near the entrance surface and the lenticular lens sheet having a tinted layer formed near the exit surface thereof.

7. The rear projection screen according to claim 6, wherein the lenticular lens sheet further comprises an exit lens part formed on the exit surface and having an array of a plurality of lens elements formed respectively in light-gathering regions in which light ray-refracted by the convex lens elements of the entrance lens part gather.

8. The rear projection screen according to claim 6, further comprising a front plate disposed opposite to the exit surface of the lenticular lens sheet, wherein the front plate has a tinted layer formed near an entrance surface thereof or an exit surface thereof, or the front plate is entirely tinted.

* * * * *